Feb. 22, 1966     P. C. BROCKETT     3,237,155
VEHICLE DETECTOR
Filed March 8, 1962
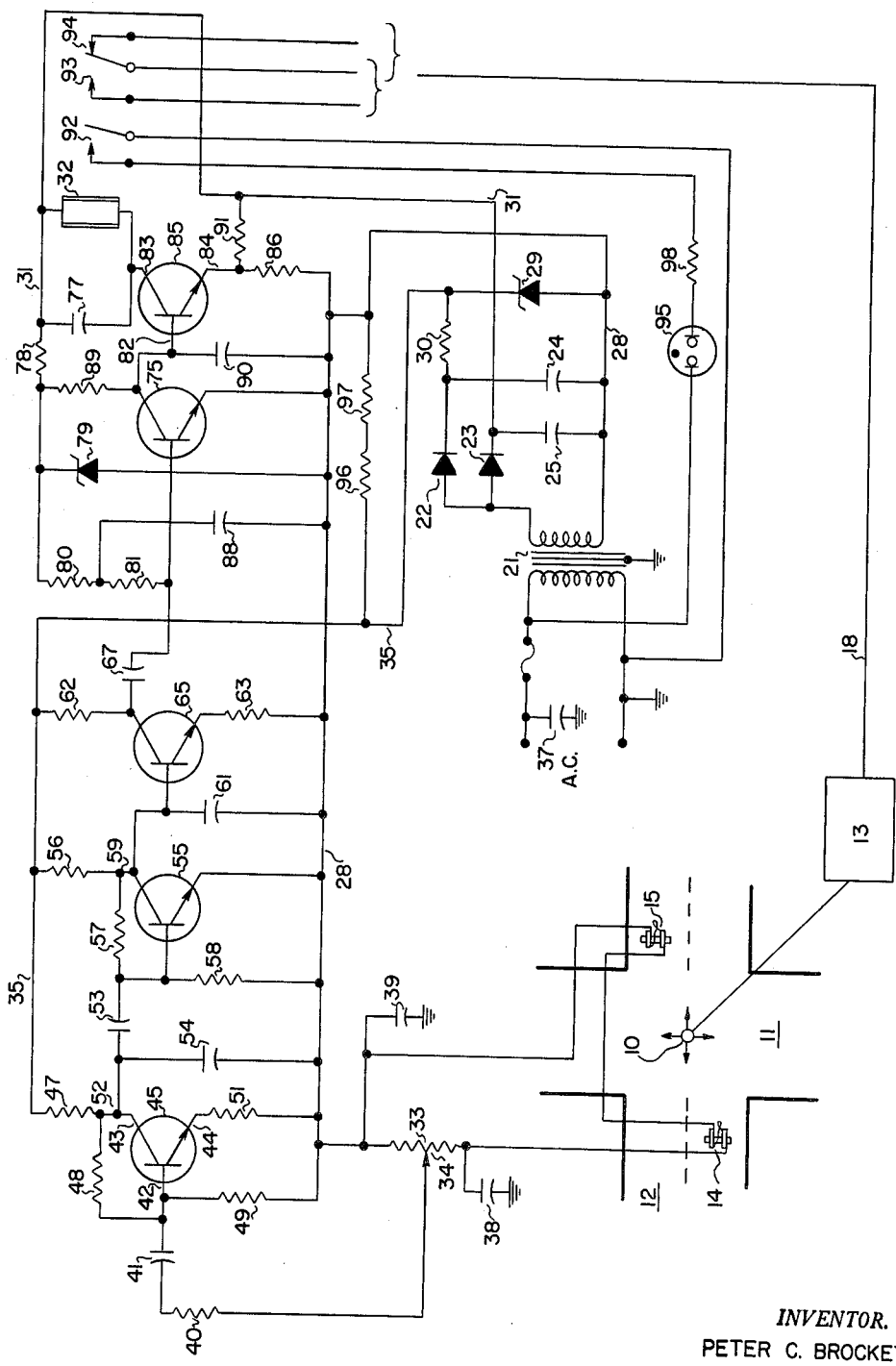
INVENTOR.
PETER C. BROCKETT
BY
Edward H. Eames
ATTORNEY

United States Patent Office 3,237,155
Patented Feb. 22, 1966

3,237,155
VEHICLE DETECTOR
Peter C. Brockett, Milford, Conn., assignor to Laboratory for Electronics, Inc., Boston, Mass., a corporation of Delaware
Filed Mar. 8, 1962, Ser. No. 178,495
7 Claims. (Cl. 340—38)

This invention relates to vehicle detector apparatus and more particularly relates to transistor apparatus for amplifying extremely low frequency pulses representing some characteristic of traffic, as for example, the passage of a vehicle.

My transistor apparatus may be employed in combination with a device, such as a magnetic type vehicle detector or sensing device which generates electrical pulses or waves responsive to a moving body of magnetic material, such as a motor vehicle, passing substantially over or in the vicinity of such detector.

The invention relates in one aspect to the transistor amplifier and response apparatus for use with such magnetic detector or sensing device and in another aspect relates to the combination of such transistor apparatus and such magnetic detector or sensing device.

One example of a magnetic type detector and its response to passing vehicles is described and illustrated in U.S. Patent 2,201,145, issued May 21, 1940, to John L. Barker, under the title "Traffic Detector."

Another example of magnetic type detector or sensing device which may be employed with transistor apparatus in accordance with the invention is the Model MK Magnetic Vehicle Detector made by Automatic Signal Division of Eastern Industries, now a division of Laboratory for Electronics, Inc., the assignee of the present application for patent, such Model MK Magnetic Detector being described and illustrated in Bulletin D–162, copyright 1957 by Eastern Industries, Inc.

One particular application of the present invention relates to transistor apparatus for amplifying extremely low frequency pulses of the order of from ¼ cycle per second to 5 cycles per second, for example, generated by passage of a motor vehicle passing substantially over or substantially in the vicinity of a detector device, such as a magnetic type vehicle detector, for example.

Amplification of such very low frequency pulses, by a transistor apparatus is complicated by several factors.

One of these factors is that a magnetic detector has a high output impedance while the transistor is basically a low input impedance device; another problem is that the gain and leakage of a transistor varies with and over a wide range of temperatures normally encountered by the apparatus.

In addition, undesirable low frequency signals such as sixty cycle alternating current (A.C.) on the detector or power line, or ripple or other voltage variations in the power supply may be present to give false indications of passing vehicles if not protected against. Also the frequency of vehicle detector pulses and the length of individual pulses vary over a wide range, from a frequency of the order of one-quarter of a cycle per second to several cycles per second with the pulse durations ranging from very short, as for example .2 second for vehicles traveling very fast, of the order of 60 miles per hour, to a pulse duration of substantially longer length, as for example 4 seconds in length for vehicles traveling very slowly, of the order of 3 miles per hour. Further, while the apparatus should be responsive to extremely low frequency pulses of short to long duration, individual response to successive rapidly recurring individual pulses from a succession of vehicles should be made by the apparatus.

It has been found that a detection pulse developed by a magnetic type vehicle detector in response to passage of a motor vehicle varies in amplitude, frequency and duration according to the speed of the vehicle as the vehicle enters into the magnetic field and the length of time the magnetic field at the detector is distorted from normal by the passing vehicle. For example, the pulse developed by the magnetic detector in response to a very fast vehicle, traveling on the order of 60 miles per hour when the vehicle passes through the magnetic field, for example, will be in the form of an A.C. pulse which will increase in amplitude from zero, for example, to a relatively high value when the vehicle enters and disturbs the magnetic field at the detector and will decrease in amplitude and pass through zero thereby reversing its polarity when the vehicle exits from the magnetic field and will return to zero when the vehicle no longer influences the magnetic field at the magnetic detector. The polarity of the pulse developed will depend upon the direction of travel of the vehicle as it passes through the magnetic field at the detector relative to the coils of the detector. The pulse developed, which is in the form of an irregular wave, has been found to be sharper and greater in amplitude, higher in frequency and shorter in duration for a fast moving vehicle than a pulse developed in response to a substantially similar vehicle moving more slowly.

In contrast, a vehicle traveling very slowly through the magnetic field will cause a pulse to be developed which will increase much more slowly than that from the faster moving vehicle and to a lesser value since the disturbance of the magnetic field is not as violent or rapid. However, the duration of the disturbance will take place for a relatively greater time period since the slower moving vehicle will take more time to pass through the magnetic field. This develops to a longer pulse of substantially lower frequency and of substantially lower amplitude.

My transistor apparatus for amplifying low frequency pulses, in its preferred form, filters all signals received and amplifies only the very low detection pulse frequencies developed by an associated magnetic detector in response to passage of a motor vehicle even though the duration, amplitude and frequency of the detection pulses may vary over a wide range, according to the speed of vehicles passing over or in the vicinity of the detector.

Accordingly, my apparatus which overcomes the problems noted above and provides the desired response to signals over a relatively wide range of very low frequencies, as for example of the order of ¼ cycle per second for very slow vehicles to approximately 5 cycles per second for very fast vehicles, and over a relatively wide range of signal lengths, uses cascaded silicon transistor amplifiers since it has been found that silicon transistors have substantially less leakage current over the range of temperatures normally encountered.

To provide such low frequency amplification, large capacitors are coupled from the collector of one transistor to the base of the succeeding transistor; capacitive means is employed to bypass higher, undesirable frequencies to ground while the power supply utilizes a zener diode as a constant voltage element to eliminate any ripple.

In addition since such magnetic detectors have a plurality of coil windings with large impedance, the invention provides a resistor in the emitter circuit and a resistor in the base circuit of the input transistor, which is basically a low input impedance device, for raising the input impedance of the transistor circuit to more closely match the impedance of the magnetic detector device.

Since this apparatus must operate over a wide temperature range, the invention provides for collector-to-base feedback to compensate for changes in leakage resulting from temperature variation. In addition, since it is known that transistors of similar commercial designation often vary in gain characteristics, the collector-to-base feedback circuit also serves to stabilize the gain of the stage of amplification in the event that one transistor is replaced by another, of similar designation, but having different gain characteristics. Further, the invention provides a direct cascade connection of succeeding amplifiers having substantially the same conductive characteristics, from the collector of one transistor to the base of the succeeding one to provide improved very low frequency response of the transistor apparatus.

It is therefore an object of the invention to provide a transistor apparatus, which includes relatively low input impedance devices, for use in combination with a magnetic detector device, which is a relatively high impedance device, for selectively amplifying the very low frequency detection pulses of a magnetic detector.

Another object is to provide a transistor apparatus for selectively amplifying extremely low frequency pulses in which the circuitry includes a network for stabilizing amplification of the amplification stages which may otherwise vary due to variation in transistor gain characteristics.

Another object is to provide transistor apparatus for selectively amplifying extremely low frequency signals and to ignore other undesirable low frequency signals caused by input power hum, electrical noises or differences in gain characteristics among the transistors.

Another object is to provide a transistor apparatus which will selectively respond to very low frequency signals developed by distortions of the magnetic field at a magnetic detector.

Another object is to provide a transistor apparatus which will provide individual response to successive rapid recurring detection pulses of an associated magnetic detector device in response to individual vehicles passing in rapid succession.

It is also an object of the invention to provide an improved amplifier and response circuit in a magnetic detector device for detecting moving vehicles over the usual wide range of traffic speeds and wide range of temperature conditions and of power supply variations, as well as mechanical vibrations found in or alongside of roadways, for example.

It is a further object to provide a magnetic detector or sensing device for generating low frequency electrical pulses in response to passage of a vehicle, in combination with transistor amplifier and response apparatus for such pulses.

As I have illustrated herein, one application of my present invention is in a traffic control signal system in which a magnetic detector is employed as a vehicle detection means and provides detection pulses to my transistor apparatus in response to passage of a vehicle, relative to the magnetic detector.

My transistor apparatus filters and amplifies any pulse received and separates undesired frequency pulses from the desired band of frequencies, which are detection pulses, and provides response in the form of energization of a relay which may close or open a pair of normally open or normally closed contacts respectively, as an output, indicative of passage of the motor vehicle relative to the magnetic detector. Such output indication may be applied to a control device which may respond to such output of my transistor apparatus, and, according to a pre-set plan, control a traffic signal, for example.

Another control system that may include a magnetic detector in combination with the present transistor apparatus is a vehicle counting device or counter which receives the filtered and amplified pulses, representative of passage of a motor vehicle relative to the magnetic detector, and accumulates or otherwise counts the output indications of passage.

My illustration, which is partly in block and partly in circuit form, is a plan view of a traffic controller system and signalized intersection. A signal 10, represented schematically, is illustrated in the intersection of roadways 11 and 12. The signal 10 is connected to a box 13, which represents a control device which may be any of the well known traffic actuated types of traffic controllers.

Devices 14 and 15 represent individual magnetic detectors or sensing devices, illustrated for example as each having a core of magnetic materials, preferably of relatively high permeability, with two series connected coils around the magnetic core. One or more coils may be used. The magnetic core may be a bar of magnetic material or a bundle of rods of iron or other magnetic material.

The core may be magnetized merely by its presence in the earth's magnetic field in one simple form, although it may be magnetized by supplementary permanent magnets or electromagnets, not shown, if desired. A core and coil combination will generate pulses or waves of electromotive force in the coil, by change of magnetic flux linking the coil, by close passage of a magnetic body such as a vehicle, which may temporarily distort the earth's magnetic field or otherwise temporarily cause a change of magnetic field at the coil.

Devices 14 and 15 may also represent other types of magnetic detectors as more fully described in any of the prior patents or publication mentioned herein, or as noted below.

The magnetic detectors 14 and 15 are illustrated as connected in series to the transistor apparatus which is shown in its preferred schematic circuit form. It may be desired to connect the magnetic detectors in parallel connection to the transistor apparatus, however, the magnetic detectors are preferably connected in series, as shown. The output of the transistor apparatus, which may be in the form of opening or closing an output circuit, is represented as being connected via lead 18 to the controller, box 13.

The lead 18 represents either output circuit which may be used and also represents both output circuits which could be jointly used, if desired.

Referring particularly to the schematic circuit part of the illustration a 60 cycle alternating current (A.C.) supply is applied to a transformer 21 and A.C. power is induced into the secondary coil of transformer 21 which is applied to the diodes 22 and 23 each of which pass current in one direction only, and in this case, the same direction for each diode.

Capacitors 24 and 25 are connected between the low voltage return 28 and the leads extending from diodes 22 and 23 respectively. A zener diode 29 is connected between lead 28 and a resistor 30 which is connected at its other end to diode 22.

The combination of capacitor 24 and resistor 30 serve to change a pulsating direct current (D.C.) into a D.C. with a ripple while the zener diode 29, which passes current at a somewhat lower voltage than that passed through diode 22 and resistor 30, serves as a voltage regulator for providing a substantially constant D.C. of approximately +10 volts, for example, which serves as the B+ supply for the transistors and other low voltage elements.

The power passed through diode 23 and filtered by capacitor 25 is applied via lead 31 to one side of the relay 32, the other side of the relay being connected to the collector 83 of normally non-conducting transistor 85. The emitter 84 of transistor 85 is connected to the return 28 through a resistor 86 which in conjunction with resistor 91 form a potential divider which lifts the emitter 84 somewhat above the potential of the return 28 so as to bias transistor 85 requiring the potential applied to the base 82 to be at least above a minimum predetermined value before transistor 85 will begin to conduct.

Capacitors 37, 38 and 39 have been placed on the input leads into the transistor apparatus to reduce the possibility of damage to the semi-conductor devices resulting from high voltage transients that may be picked up in field wiring.

As more fully described in the said Barker U.S. Patent 2,201,145 when a motor vehicle traveling on a roadway 12 passes substantially over or very close to either of the magnetic detectors 14 or 15, the electromagnetic field around the magnetic detector is distorted from its normal condition and an electrical pulse is developed in the pulse developing circuit of the magnetic detectors 14 and 15 and applied to potentiometer 33.

The amplitude and fundamental frequency of the output voltage of the pulse developing circuit is proportional to the speed of the actuating vehicle. Further the pulse duration is inversely proportional to the speed of the actuating vehicle for vehicles of substantially the same length.

The electrical pulse is applied across the resistance element of the potentiometer 33. The arm 34 serves as an adjustable pick-off which picks off a desired part of any pulse appearing across the resistance element and as such serves as a sensitivity control for the combination magnetic detector and transistor apparatus, which may be used to adjust the effective range of the magnetic detectors.

The pulse picked off by arm 34 is applied to base 42 of transistor 45 through resistor 40 and coupling capacitor 41. Resistor 40 and resistor 51 cooperatively combine in their respective circuits to increase the input impedance of transistor 45 to substantially match the impedance of the magnetic detector at a frequency within the range of the operating frequencies. This is provided since transistors are basically low impedance input devices.

Resistors 47, 48 and 49 between B+ lead 35 and the return lead 28 form a potential divider for development of operating bias for transistor 45. Further, resistor 48 and resistor 51 cooperatively combine to provide circuitry network for compensating for variations in operating characteristics of transistor 45 due to temperature variations. In addition resistors 48 and 51 cooperatively combine to provide gain stabilization of the amplifier stage so that replacement of transistor 45 may be made by a similar type transistor having somewhat different gain characteristics.

Accordingly, resistor 48 forms part of the collector 43 to base 42 feedback circuit while the resistor 51 forms part of the collector 43 to emitter 44 conduction circuit, with resistor 47 connected between B+ and the collector terminal 43, and with resistor 51 connected between emitter terminal 44 and the return 28.

As variations in impedance in the collector to emitter circuit of transistor 45 occur due to variations in temperature, or a result of substitution of transistors, the potential at the junction 52 will vary. Such variation in potential at junction 52 will be applied to the feedback circuit through resistor 48, which, through a degenerative effect varies the strength of the input applied to base 42 so as to vary the amount of conduction through the collector to emitter circuit and thus stabilize the potential at junction 52 and thereby self-compensate for variations in conduction characteristics of the transistor.

Transistor 45 is normally conducting and is in an isolated D.C. circuit by virtue of capacitors 41, 53 and 54. When a pulse is applied to the base 42, conduction through the collector to emitter circuit changes accordingly and an amplified pulse appears at junction 52 and passes through coupling capacitor 53 to the base of transistor 55. Capacitor 54 connected between junction 52 and the return 28 serves as a high frequency by-pass which passes all frequencies above the very low frequency band representative of vehicle passage, to the return.

Resistors 56, 57, and 58 form a potential divider and provide the operating bias for the transistor 55. Resistor 57 also serves as part of a feedback circuit between the collector of transistor 55 and the base of transistor 55 which circuit serves as a stabilization circuit in a manner similar to that of resistors 48, described above. Thus, resistor 57 serves a dual purpose relative to transistor 55 as does resistor 48, relative to transistor 45.

The pulse passed to the base of normally conducting transistor 55 is again amplified and appears at junction 59 and applied directly to the direct coupled transistor 65. The base of transistor 65 is coupled directly to the collector of transistor 55 for more efficient response to the very low frequency signals.

Capacitor 61 serves as a high frequency by-pass which passes all frequencies above the very low frequencies, to the return. Resistor 62 serves to load the collector circuit of transistor 65 and resistor 63 serves to stabilize operation of the transistor 65 in the direct coupled input circuit.

In the preferred circuit, the value of resistor 63 is relatively greater than the value of resistor 51, and with substantially no resistance in the emitter circuit of the transistor 55, the normal gain of transistor 65 is reduced below the normal gain of transistors 45 and 55. Reduction in the gain of transistor 65 is provided so that response by transistor 65 to changes in conduction characteristics by transistor 55, through temperature changes, is eliminated.

Capacitor 67 serves to couple the output signal of transistor 65 to the base of transistor 75.

Transistor 75 which is normally conducting is direct coupled to the base 82 of transistor 85 which transistor is normally non-conducting. Transistor 75 serves as a "trigger" and transistor 85 serves as a "switch." Transistor 75 provides a signal voltage to reverse the condition of transistor 85 when such signal voltage is of sufficient amplitude to overcome the cut-off bias applied to the emitter 84 of transistor 85.

Transistors 75 and 85 are connected to the B+ supply fed via lead 31. Transistor 85 is connected through parallel paths of the relay 32 and the capacitor 77 to the unregulated supply, lead 31.

Resistor 78, in series with zener diode 79 between lead 31 and return 28, provide a regulated B+ supply for transistor 75. Resistors 80 and 81 form a potential divider between which the capacitor 88 is connected and serves for decoupling and for filter purposes which tend to stabilize operation of transistor 75 and make for a more stable "trigger."

Resistor 89 serves as the collector load and capacitor 90 serves as a high frequency by-pass filter. Capacitor 77, which is also across the coil of relay 32 as well as being in parallel with the relay between B+ and the collector 83, prevents high voltage transient voltages from developing in the coil of relay 32 when transistor 85 reverses from a state of conducting to non-conducting thereby causing relay 32 to become de-energized and released.

Resistor 86 between the emitter 84 and return 28 and resistor 91 between the emitter 84 and the unregulated B+ 31 provide a cut-off bias or threshold level for the transistor 85. This provides a reference from which arm 34 on potentiometer 33 may be adjusted.

Thus a signal appearing across the resistance element of the potentiometer 33 is picked-off by arm 34 and applied to the first of a series of amplifier stages.

The signal is amplified and filtered and any signal within the band of passed frequencies is applied to the normally conducting "trigger" transistor 75 which reverses its conductive condition upon application of such signals to its base. When transistor 75 becomes reversed from normally conducting to non-conducting, the potential across resistor 89 changes and such potential change is applied to the base 82 of transistor 85 and transistor 85 switches from a normally non-conductive state to a conductive state.

When transistor 85 conducts, relay 32 becomes energized since relay 32 is in the collector to emitter conduction circuit of transistor 85. Relay 32 pulls in and reverses the condition of its contacts 92, 93, and 94. Normally open contact 92 controls the illuminating circuit for indicator lamp 95 such that indication lamp 95 will be illuminated to indicate relay response.

It should be noted that the indicator lamp may be remotely located if desired.

Normally open contact 93 and normally closed contact 94 represent output circuits which may be closed and open respectively in response to relay operation. The output leads may be applied to a controller, as represented by box 13 via a representative lead 18.

Resistors 96 and 97 form a potential divider between B+ lead 35 and the return 28 and are of such value as to reduce the potential at the junction between the two resistors so that potential readings may be taken from the junction between the resistors to the emitter terminal of transistor 65.

This permits use of a low level voltage meter so that small changes in voltage that occur at the emitter terminal may be read more conveniently.

Although the transistor apparatus has been described and illustrated as being combined with a magnetic detector of the type described in the said Barker Patent 2,201,145 other types of magnetic detectors such as described in U.S. Patents 2,201,146 and 2,441,554, both issued to John L. Barker, for example, may be used in lieu of the form of magnetic detector illustrated. Illustration of a magnetic detector including two coils in series around a magnetic material core and reference to other particular types of magnetic detector is not to be construed as limiting the type of magnetic detector which may be used in combination with my transistor apparatus as other types, including one coil or three or more coil type magnetic detectors may be used, if desired.

The following are typical values or commercial designations of the components of my transistor apparatus, although such following typical values and commercial designations are not to be construed as limiting components of my invention to such values and designated parts.

Capacitors: Microfarads
- 24 _____ 200
- 25 _____ 200
- 37 _____ .01
- 38 _____ .01
- 39 _____ .01
- 41 _____ 100
- 53 _____ 250
- 54 _____ 50
- 61 _____ 50
- 67 _____ 250
- 77 _____ 100
- 88 _____ 100
- 90 _____ 100

Diodes: Type
- 22 _____ F2
- 23 _____ F2
- 29 _____ 1EZ10T10
- 79 _____ 1EZ10T10

Resistors: Ohms
- 30 _____ 300
- 33 _____ 150,000
- 40 _____ 20,000
- 47 _____ 10,000
- 48 _____ 100,000
- 49 _____ 33,000
- 51 _____ 100,000
- 56 _____ 10,000
- 57 _____ 100,000
- 58 _____ 33,000
- 62 _____ 3,900
- 63 _____ 2,000
- 79 _____ 100,000
- 80 _____ 33,000
- 81 _____ 100,000
- 86 _____ 10,000
- 89 _____ 10,000
- 91 _____ 1,000
- 96 _____ 39,000
- 97 _____ 5,100
- 98 _____ 160,000

Transistors: Type
- 45 _____ TI495
- 55 _____ TI495
- 65 _____ TI494
- 75 _____ TI494
- 85 _____ TI484

Relay coil 32 _____ ohms __ 185
Lamp 95 _____ type __ NE2

The transformer is of the type arranged to receive substantially 110 volts 60 cycle A.C. power and provide an output of substantially 12 volts A.C.

It may be desired to operate the relay 32 directly by the "trigger" transistor 75 and have relay 32 normally in an energized condition so that release or de-energization of the relay may indicate vehicle detection.

This may be accomplished by removing the resistor 89 from the circuit as shown and substituting the relay 32 and parallel capacitor 77 so that the relay and capacitor are connected in parallel between the B+ supply and the collector terminal of normally conducting "trigger" transistor 75.

With such modification the circuitry and associated electrical components of transistor 85, capacitor 90 (including the lead to the return) and resistors 86 and 91 would be eliminated. It may be necessary to provide a more sensitive relay in the alternate arrangement than may be used in the preferred circuit.

Since resistors 86 and 91 and the circuitry providing a threshold level has been eliminated in such alternative circuit, adjustment of arm 34 may be made, as desired, according to response of transistor 75 and the release current of relay 32. Thus the relay in the collector to emitter conduction circuit of transistor 75, may be made to respond to detection pulses applied across the resistance of potentiometer 33.

Of course the contacts 92, 93, and 94 may still be operated by the relay. However, it may be desired to reverse the contact 92 so that the indicator lamp 95 is illuminated upon drop-out of the relay.

As illustrated in the drawing, the combination of transistor 55 and transistor 65 in direct coupling in the amplifier circuit provides a low frequency pulse amplifier that is fully responsive to very low frequencies that are the amplified output of the first amplifier stage, with no attenuation of D.C. between the direct coupled stages.

Although the preferred form of the circuit employs three transistor stages 45, 55, 65, it may be desired to reduce the stages of amplification and the overall sensitivity of the pulse amplifier circuit, where sufficient input is available, for example. This may be accomplished by eliminating transistor 65 and its associated circuitry including capacitor 61 and resistors 62 and 63 and by having the collector of transistor 55, at junction 59, connected to the base of transistor 75 through a coupling capacitor, such as 67, for example.

Although alternate arrangements of the present invention have been described, it will be obvious to those skilled in the art that other changes in form, arrangement and connections of the various elements and substitution of components may be made without departing from the spirit of the invention within the scope of the claims.

I claim:

1. A vehicle detector including in combination,
    sensing means comprising a magnetic core and a high impedance coil for linking a weak magnetic field such as the earth's magnetic field when said sensing means is placed adjacent a vehicle path, said sensing means generating low frequency voltage pulses having a period of the order of four seconds to one-fifth of a second in response to changes in such linking magnetic field by passage of a vehicle adjacent said coil and dependent upon the speed of the vehicle, a multi-stage transistor-amplifier circuit including first and second stages each including a transistor having base, emitter and collector elements, connected in common emitter configuration, said amplifier circuit having an input circuit coupled to the base of the first stage, means including a high resistance connected in series with said base in said input circuit to couple said input circuit to said high impedance coil, and means including a further high resistance in series with said emitter of said first stage for substantially matching the impedance of the base-emitter circuit of said first stage to the impedance of said high impedance coil and input circuit, a low impedance capacitance-resistance circuit comprising a series capacitance and shunt resistance coupling the first and second stages of said multi-stage circuit, said capacitance-resistance circuit having a time constant substantially longer than said longest period of said pulses, and transistor trigger circuit means having a normal condition as to conduction, said trigger circuit means being coupled to the output of said multi-stage transistor amplifier circuit to be operated thereby to reverse said conduction condition to provide a control output in response to the amplified said low frequency pulse output of said coil.

2. A vehicle detector as in claim 1 and in which said multi-stage amplifier circuit includes three stages and transistors of the same conductivity type in the second and third said stages, and a circuit directly connecting the collector of said second stage to the base of said third stage.

3. A vehicle detector as in claim 1 and including capacitors coupled between the ends of said high impedance coil and ground, said last-named capacitors having a low capacitance for shunting to ground any high frequency surges therein having a period considerably shorter than said shortest period in said range of periods of said low frequency pulses generated in response to passage of vehicles, without any substantial shunting of said low frequency pulses.

4. A vehicle detector as in claim 1 and in which said means for coupling said high impedance coil to said input circuit includes a potentiometer in shunt with said coil and having an adjustable tap thereon, a series circuit including said first named high resistance and a capacitor coupling said tap to said base of said first stage of said amplifier, and another high resistance connected between last-named base and one end of said potentiometer, said last-named capacitor having a relatively high value of capacitance to provide low impedance for said low frequency pulses.

5. A vehicle detector as in claim 1 and in which said first and second amplifier stages each include a resistance coupling the collector to the base of the respective transistor for providing degenerative feedback bias to said base for stabilizing operation of the transistor in relation to its gain.

6. A vehicle detector as in claim 1 and including a relay coupled to the output of said trigger circuit means to be operated by said control output thereof.

7. A vehicle detector as in claim 1 and including a power supply circuit for deriving direct current from an alternating current source, said power supply circuit including an input circuit for said alternating current source, and a rectifier and filter capacitor coupled to said alternating current input circuit, and a resistance and a reverse connected Zener diode having a lower break-down voltage than the direct current output of said rectifier and capacitor circuit, said Zener diode and resistance circuit being coupled in series across said filter capacitor, and means for coupling said Zener diode across the collector-emitter circuits of said multi-stage transistor amplifier, to provide a stabilized source of direct current for said amplifier circuit substantially independent of minor variations in said input power supply and in the direct current output of said rectifier.

References Cited by the Examiner

UNITED STATES PATENTS

| | | | |
|---|---|---|---|
| 2,450,166 | 9/1948 | Rich | 340—38 |
| 2,532,231 | 11/1950 | Jarvis | 340—38 |
| 2,883,108 | 4/1959 | Thorton | 340—38 |
| 2,917,732 | 12/1959 | Chase | 340—38 |
| 2,978,615 | 4/1961 | Chater | 317—148.5 |
| 3,050,662 | 8/1962 | Miller | 317—148.5 |

NEIL C. READ, *Primary Examiner.*

THOMAS B. HARBECKER, *Examiner.*